United States Patent
Ripper et al.

(10) Patent No.: US 7,263,434 B2
(45) Date of Patent: Aug. 28, 2007

(54) METHOD FOR MONITORING A COMPONENT SITUATED IN AN EXHAUST GAS REGION OF AN INTERNAL COMBUSTION ENGINE

(75) Inventors: Wolfgang Ripper, Stuttgart (DE); Stefan Wickert, Albershausen (DE); Torsten Handler, Suttgart (DE); Dirk Samuelsen, Ludwigsburg (DE); Klaus Mueller, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/996,490

(22) Filed: Nov. 24, 2004

(65) Prior Publication Data

US 2005/0143897 A1   Jun. 30, 2005

(30) Foreign Application Priority Data

Dec. 12, 2003   (DE)   ............................... 103 58 195

(51) Int. Cl.
*G60G 7/70*   (2006.01)
(52) U.S. Cl. ...................... 701/114; 374/144; 73/118.1; 60/277

(58) Field of Classification Search ................ 701/108, 701/109, 114; 374/100, 141; 73/116, 118.1; 60/272, 277
See application file for complete search history.

(56) References Cited

U.S. PATENT DOCUMENTS

| | | | |
|---|---|---|---|
| 3,882,451 A * | 5/1975 | Fujishiro et al. ............ | 374/144 |
| 5,177,463 A * | 1/1993 | Bradshaw et al. .......... | 340/438 |
| 2004/0221571 A1* | 11/2004 | Lewis et al. .................. | 60/277 |
| 2005/0103099 A1* | 5/2005 | van Nieuwstadt et al. . | 73/118.1 |

FOREIGN PATENT DOCUMENTS

DE   44 26 020   1/1996

* cited by examiner

*Primary Examiner*—Stephen K. Cronin
(74) *Attorney, Agent, or Firm*—Kenyon & Kenyon LLP

(57) ABSTRACT

A method for monitoring a component situated in an exhaust gas region of an internal combustion engine in which the low pass behavior, which is determined by the heat capacity of the component, is monitored by a valuation of a measure of a first exhaust gas temperature, which appears upstream of the component that is to be monitored, and of a second exhaust gas temperature, which is recorded by a second temperature sensor downstream from the component to be monitored.

10 Claims, 2 Drawing Sheets

_US 7,263,434 B2_

METHOD FOR MONITORING A COMPONENT SITUATED IN AN EXHAUST GAS REGION OF AN INTERNAL COMBUSTION ENGINE

FIELD OF THE INVENTION

The present invention relates to a method for monitoring a component situated in an exhaust gas region of an internal combustion engine, in which a measure is ascertained for a first exhaust gas temperature that appears upstream of the component, and in which a second exhaust gas temperature is measured which appears downstream from the component.

BACKGROUND INFORMATION

German Patent Application No. DE 44 26 020 describes a method, in which the operativeness of a catalytic converter, that is situated in the exhaust gas region of an internal combustion engine, is monitored. The monitoring is performed with the aid of the temperature increase generated by an exothermic reaction of the exhaust gases in the catalytic converter. Two temperature signals are ascertained, the first temperature signal being based on a measurement of the temperature downstream from the catalytic converter, and the second temperature signal being calculated with the aid of a model.

The present invention is based on the object of providing a method for monitoring a component situated in the exhaust gas region of an internal combustion engine, which makes possible making a statement concerning a change in the component.

SUMMARY OF THE INVENTION

According to the present invention, monitoring the thermal low pass behavior of the component is provided, which is determined by the heat capacity of the component. The monitoring takes place by a valuation of the first exhaust gas temperature that occurs upstream of the component, with respect to the second exhaust gas temperature, which is measured downstream from the component. In response to a change of a predefined measure of the thermal low pass behavior of the component, an error signal is emitted.

The method according to the present invention makes possible monitoring of the component for a change which may have taken place, for example, during an inadmissible manipulation. In the extreme case, the component to be monitored, such as a catalytic converter and/or a particulate filter, may have been completely removed. The thermal low pass behavior of the component to be monitored is determined by its heat capacity. The concepts "heat capacity" and "thermal low pass behavior" are mutually interchangeable. Only the concept of thermal low pass behavior is still used below.

For the components to be monitored, the predefined measure for the thermal low pass behavior may be either calculated or ascertained experimentally.

The method according to the present invention makes possible a simple monitoring of the components situated in the exhaust gas region of the internal combustion engine, either within the scope of controls, which have to be carried out with respect to keeping up exhaust gas norms, or during normal operation.

The measure for the first exhaust gas temperature, which corresponds to the exhaust gas temperature upstream of the component to be monitored, may be calculated instead of a measurement, preferably in the light of an exhaust gas model. The first exhaust gas temperature may be calculated from quantities, such as rotary speed and torque, or rotary speed and metered fuel rate, which are present in an engine control.

A first embodiment of the method according to the present invention provides a low pass filtering of the variation with time of the first exhaust gas temperature, and a subsequent difference formation from the variation with time of the second exhaust gas temperature. The time constant of the low pass filtering should be approximately set to the expected value of the component to be monitored. Exceeding a predefined threshold or leaving a threshold band upwards or downwards of the difference indicates that a change has occurred in the thermal low pass behavior.

Another embodiment of the method according to the present invention provides the formation of a tolerance band about the first exhaust gas temperature, and subsequently a difference formation of the boundaries of the tolerance band from the second exhaust gas temperature. The tolerance band about the first exhaust gas temperature is formed by adding a predefined amount to the current exhaust gas temperature value, and by subtracting an also predefined amount. The spread of the tolerance band may be calculated or determined experimentally. The difference formation from the second exhaust gas temperature and the comparison of the difference to a predefined threshold value or threshold band makes possible the statement on the change in the thermal low pass behavior.

Another embodiment of the method according to the present invention provides a gradient formation of the variation with time of the exhaust gas temperatures as well as a subsequent valuation of the gradient. The gradient formation makes possible the simple ascertainment of signal maxima or signal minima. In one further development, in order to ascertain the low pass behavior, an evaluation of the time difference between two temperature maxima and/or temperature minima may be provided. One other embodiment within the scope of gradient formation provides a comparison of the gradients of the temperature variation.

Still another embodiment of the method according to the present invention provides an amplitude comparison between the first and second exhaust gas temperature. Based on the low pass behavior of the component to be monitored, smaller amplitudes come about for the second exhaust gas temperature than for the first exhaust gas temperature. By making a comparison to a predefined threshold value or threshold band for the two ascertained amplitudes, it is possible to monitor the thermal low pass behavior.

Still another embodiment of the method according to the present invention provides a spectral analysis of the variation with time of the first and second exhaust gas temperature. Based on the low pass behavior of the component to be monitored, the center of gravity of the spectral lines or of the continuum shift starting from higher frequency portions for the first exhaust gas temperature to the lower frequency portions for the second exhaust gas temperature. For example, the thermal low pass behavior may be monitored by forming the center of gravity of the envelope of the two spectral curves, and by making a comparison to a predefined threshold value or threshold band.

Still another embodiment of the method according to the present invention provides a correlation of the second exhaust gas temperature to the first exhaust gas temperature. The correlation is a mathematical operation which gives a higher numerical value for correlating exhaust gas temperatures than for deviating ones. A high value of the correlation accordingly shows a reduced low pass behavior.

A further refinement provides that the measure for the first exhaust gas temperature is given by a load signal and/or a torque of the internal combustion engine.

DETAILED DESCRIPTION

Figure 1:
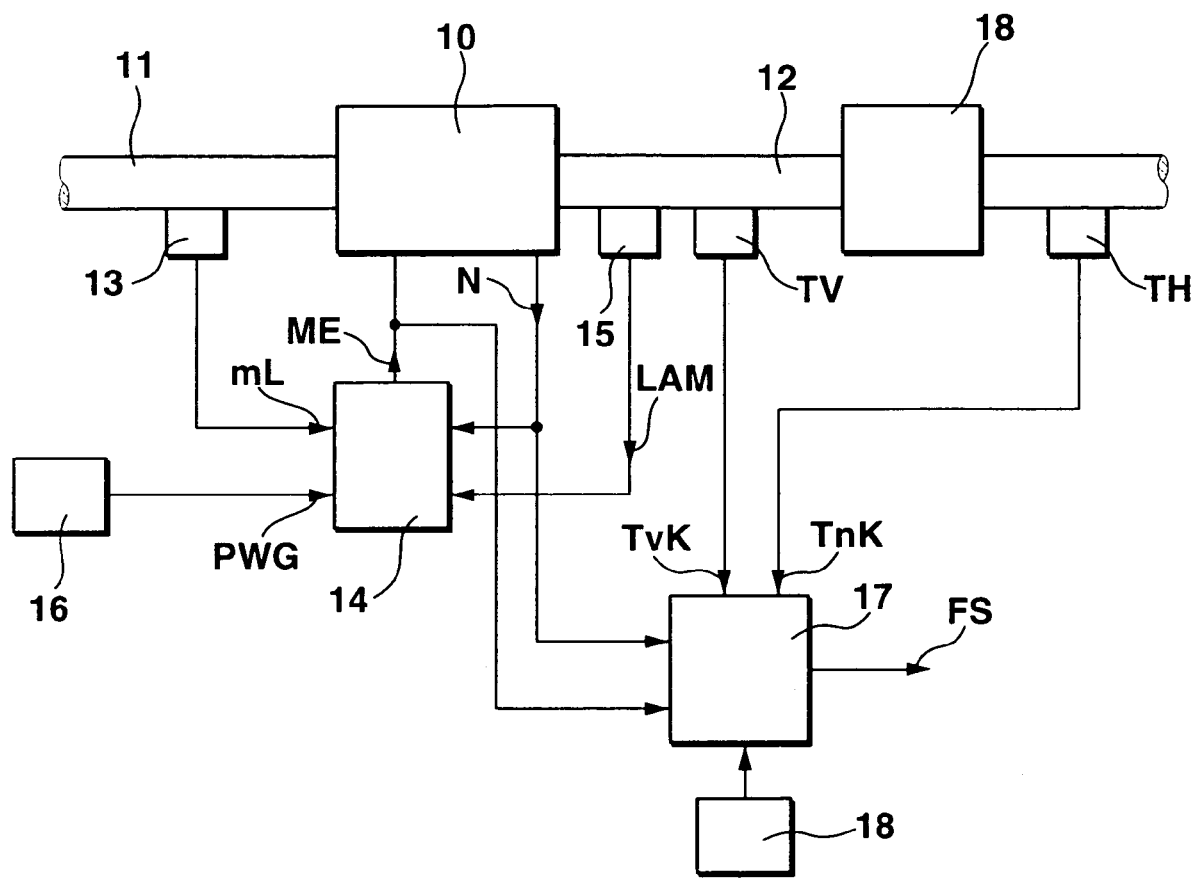
FIG. 1 shows a technical environment in which a method according to the present invention runs.

FIG. 1 shows an internal combustion engine 10 having an intake region and an exhaust gas region 11, 12. In intake region 11 there is situated an air-mass flow sensor or an air quantity flow sensor 13, which emits an air-mass signal or an air quantity flow signal mL to engine control 14. In exhaust gas region 12 there is situated a lambda sensor 15, which emits a lambda signal LAM to engine control 14. Engine control 14 ascertains from air-mass signal mL, from lambda signal LAM and from an accelerator signal PWG, which is made available by a gas pedal 16, a fuel signal ME, which is a measure of the fuel quantity supplied to internal combustion engine 10.

A rotary speed signal N is also supplied to engine control 14.

Fuel signal ME and rotary speed signal N are additionally conducted to a monitoring device 17, which monitors a component 18 situated in exhaust gas region 12. Upstream of component 18 that is to be monitored, a first temperature sensor TV is situated which emits a first temperature signal TvK to monitoring device 17. Downstream from component 18 that is to be monitored, a second temperature sensor TH is situated, which emits a second temperature signal TnK to monitoring device 17. From the comparison of signals to threshold values, which are stored in a threshold value memory 18, monitoring device 17, if necessary, emits an error signal FS.

Figure 2:
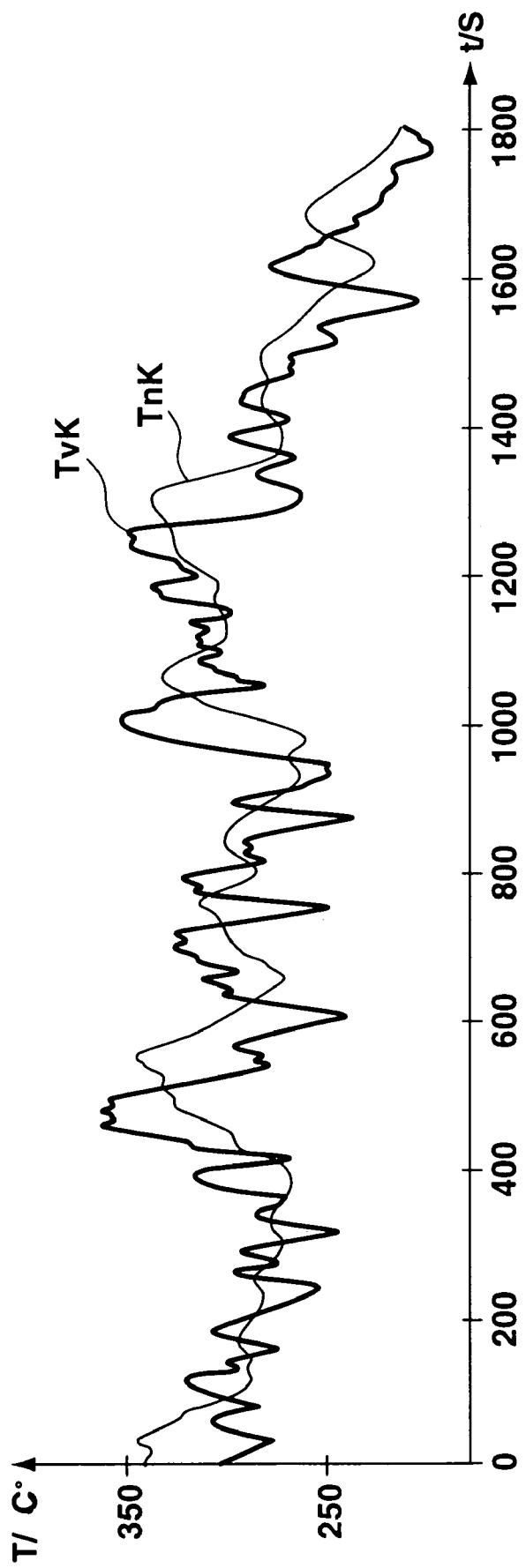
FIG. 2 shows exhaust gas temperatures as a function of time.

FIG. 2 shows the first and the second exhaust gas temperatures TvK, TnK as a function of time t. First exhaust gas temperature TvK has more changes with respect to time than second exhaust gas temperature TnK. In addition, first exhaust gas temperature TvK has a greater amplitude with respect to predefined time intervals than second exhaust gas temperature TnK.

The device shown in FIG. 1 operates as follows:

Engine control 14 ascertains fuel signal ME, which forms the basis for metering fuel to internal combustion engine 10, as a function of air quantity signal mL, of accelerator signal PWG, of rotary speed N and of lambda signal LAM. Component 18, that is to be monitored, is situated in exhaust gas region 12 of internal combustion engine 10. Component 18 may be, for example, a catalytic converter or, for instance, a particulate filter.

First temperature sensor TV records first exhaust gas temperature TvK, which appears upstream of component 18 that is to be monitored. Second temperature sensor TH records second exhaust gas temperature TnK, which appears downstream from component 18 that is to be monitored.

The method according to the present invention for monitoring component 18 that is situated in exhaust gas region 12 of internal combustion engine 10 is based on checking the thermal low pass behavior of component 18 that is to be monitored, which occurs based on its heat capacity.

The method according to the present invention starts from the fact that second exhaust gas temperature TnK is constantly recorded by an actually present temperature sensor, by second temperature sensor TH in the exemplary embodiment. First exhaust gas temperature TvK may be recorded by a temperature sensor, in the exemplary embodiment shown, by first temperature sensor TV. Alternatively or additionally, calculation of first exhaust gas temperature TvK is provided, using a model of the exhaust gas. Using the model included in monitoring device 17, a measure for first exhaust gas temperature TvK may be ascertained, for instance, from rotary speed N and fuel signal ME. If necessary, for example, air-mass signal or air quantity flow signal mL may be drawn upon additionally or alternatively to fuel signal ME.

The measure for first exhaust gas temperature TvK may also be given only by fuel signal ME or by air-mass signal or air quantity flow signal mL or by accelerator signal PWG in conjunction with rotary speed signal N, corresponding to the torque or the load of internal combustion engine 10, since the torque and the load mirror first exhaust gas temperature TvK.

A first embodiment of the method according to the present invention provides a low pass filtering of first exhaust gas temperature TvK, and a subsequent difference formation from second exhaust gas temperature TnK. The low pass behavior of component 18 that is to be monitored may be indicated in a simple approximation as low pass behavior of the first order. Therefore, the low pass filtering of first exhaust gas temperature TvK that is running in monitoring device 17 may be approximated using a corresponding low pass filter of the first order. The time constant of the low pass filtering should be adjusted to the expected time constant of component 18 that is to be monitored. The adjustment may be calculated or may take place experimentally. At the output of the low pass filter a signal is ready which, at least approximately, is equivalent to second exhaust gas temperature TnK. A difference formation between low pass filtered first exhaust gas temperature TvK and measured second exhaust gas temperature TnK makes possible a statement concerning whether the low pass behavior of component 18, that is to be monitored, has changed. By comparison of the difference to a threshold value, stored in a threshold value memory 18, or a threshold band having an upper and a lower threshold, it may be decided whether the change in the low pass behavior exceeds the measure predefined by the threshold value or threshold band. If so, error signal FS is emitted, which signals the change in the low pass behavior of component 18 that is to be monitored. A change in the low pass behavior occurs if component 18, that is to be monitored, has been partially or completely removed, or has been exchanged for another component having a higher heat capacity.

Another embodiment of the method according to the present invention provides that a tolerance band be laid about first exhaust gas temperature TvK, and subsequently a difference from second exhaust gas temperature TnK is formed. If the ascertained difference exceeds or undershoots a threshold value or a threshold band that is stored in threshold value memory 18, emission of error signal FS takes place. The tolerance band about first exhaust gas temperature TvK may be formed in that a predefined temperature amount is added and a predefined temperature amount is subtracted. The amounts are selected in such a way that, in a component 18 that is to be monitored according to the rules, second exhaust gas temperature TnK lies within the tolerance band of first exhaust gas temperature TvK at every point in time. A change in the low pass behavior of component 18, that is to be monitored, leads to second exhaust gas temperature TnK either leaving the tolerance band or lying too far in the middle. If the difference formation between the second exhaust gas temperature and the tolerance band exceeds or undershoots the predefined threshold value or threshold band, error signal FS is emitted.

Another embodiment of the method according to the present invention provides a gradient formation of the two exhaust gas temperatures TvK, TnK and a valuation of the gradient. A valuation of the gradient may, for example, include the ascertainment of maxima and/or minima, of both first exhaust gas temperature TvK and second exhaust gas temperature TnK. An evaluation of a time difference of maxima and/or minima between the two exhaust gas temperatures TvK, TnK is a measure of the delay of second exhaust gas temperature TnK compared to first exhaust gas temperature TvK, based on the low pass behavior, by component 18 that is to be monitored. A comparison of the time difference to a threshold value stored in threshold value memory 18 or threshold band leads, if indicated, to the emission of error signal FS.

A different valuation of the gradient is, for example, the valuation of the amplitude of the gradient of first exhaust gas temperature TvK in comparison to the amplitude of the gradient of second exhaust gas temperature TnK. Based on the smoothing effect of the low pass behavior of component 18, that is to be monitored, the amplitude of the gradient of second exhaust gas temperature TnK has to be lower than the amplitude of the gradient of first exhaust gas temperature TvK. Another evaluation of the gradients is based on a comparison of their averages.

An amplitude comparison is also possible directly between first exhaust gas temperature TvK and second exhaust gas temperature TnK, so that ascertaining the gradient may be omitted. The ascertainment of differences between amplitudes as well as directly between exhaust gas temperatures TvK, TnK and/or the gradients of exhaust gas temperatures TvK, TnK has to be set to a fixed time interval during the variation with time. The interval may progress with time t, stepwise or continuously.

Still another embodiment of the method according to the present invention provides a spectral analysis of the first and second exhaust gas temperature TvK, TnK. The spectral analysis may be done, for instance, by fast Fourier transformation FFT. Based on the low pass behavior of the component that is to be monitored, there is a shift in the spectrum of the first exhaust gas temperature TvK from higher spectral components down to lower spectral components at the second exhaust gas temperature TnK. A comparison of the two spectral components is possible, for instance, by forming the averages. In forming the averages, the average frequency of the first and the second exhaust gas temperature TvK, TnK is ascertained. The formation of the average is equivalent to ascertaining the center of gravity of the plane that is defined by the amplitude and the frequency.

By a formation of the difference and a comparison of the difference to a threshold value or threshold band stored in a threshold value memory 18, if necessary, error signal FS is emitted.

Still another embodiment of the method according to the present invention provides a correlation calculation of the first exhaust gas temperature TvK to the second exhaust gas temperature TnK. The resulting correlation coefficient may be normalized to the quantity 1 if component 18, that is to be monitored, is not present. In this case, one assumes the agreement of first and second exhaust gas temperature TvK, TnK. On this assumption, in the case of a component 18 that is to be monitored according to the rules, the correlation coefficient has to have a predefined value of less than 1. The method is described in Bronstein, Handbook of Mathematics, Publisher Harry Deutsch, chapter 16.3.4 ff.

Yet another embodiment of the method according to the present invention provides a correlation calculation of second exhaust gas temperature TnK to the load and/or the torque and/or fuel signal ME (the fuel injection quantity) of internal combustion engine 10. The load and/or the torque and/or fuel signal ME of internal combustion engine 10 are measures for first exhaust gas temperature TvK. The load or the torque may be ascertained in monitoring device 17, for example, from rotary speed signal N and fuel signal ME or air-mass flow signal mL.

The advantage of this measure is that the variables named are available in engine control unit 14 of internal combustion engine 10, and only have to be evaluated.

The signal conditioning and the signal valuation of the method according to the present invention may be completely implemented as software. Monitoring device 17 as well as threshold value memory 18 are preferably included in engine control 14.

What is claimed is:

1. A method for monitoring a component situated in an exhaust gas region of an internal combustion engine, the method comprising:
   ascertaining a measure for a first exhaust gas temperature upstream of the component;
   low-pass filtering the measure for the first exhaust gas temperature;
   measuring a second exhaust gas temperature by a temperature sensor, which occurs downstream from the component;
   checking a low pass behavior, which is determined by a heat capacity of the component, by a valuation of the low-pass filtered measure for the first exhaust gas temperature with respect to the measured second exhaust gas temperature, the measured second exhaust gas temperature not having been low-pass filtered; and
   emitting an error signal in response to a change of a predefined measure for the low pass behavior of the component.

2. The method according to claim 1, further comprising calculating the measure for the first exhaust gas temperature using a model of exhaust gas, in which at least one of a fuel signal, an air-mass signal and an air quantity flow signal of the engine is taken into consideration.

3. The method according to claim 1, wherein at least one of a torque and a load of the engine is used as a measure for the first exhaust gas temperature.

4. The method according to claim 1, further comprising providing a low pass filtering of the first exhaust gas temperature and subsequently a difference formation from the second exhaust gas temperature.

5. The method according to claim 1, further comprising providing a correlation of the first exhaust gas temperature to the second exhaust gas temperature.

6. A method for monitoring a component situated in an exhaust gas region of an internal combustion engine, the method comprising:
   ascertaining a measure for a first exhaust gas temperature upstream of the component;
   measuring a second exhaust gas temperature by a temperature sensor, which occurs downstream from the component;

checking a low pass behavior, which is determined by a heat capacity of the component, by a valuation of the first exhaust gas temperature with respect to the second exhaust gas temperature;

emitting an error signal in response to a change of a predefined measure for the low pass behavior of the component; and providing a formation of a tolerance band about the first exhaust gas temperature and a subsequent difference formation between the tolerance band and the second exhaust gas temperature.

7. A method for monitoring a component situated in an exhaust gas region of an internal combustion engine, the method comprising:

ascertaining a measure for a first exhaust gas temperature upstream of the component;

measuring a second exhaust gas temperature by a temperature sensor, which occurs downstream from the component;

checking a low pass behavior, which is determined by a heat capacity of the component, by a valuation of the first exhaust gas temperature with respect to the second exhaust gas temperature;

emitting an error signal in response to a change of a predefined measure for the low pass behavior of the component; and providing a gradient formation of the first and second exhaust gas temperatures and a subsequent valuation of the gradients.

8. The method according to claim 7, further comprising providing an ascertainment of a time difference between at least one of maxima and minima between the two gradients of the first and second exhaust gas temperatures.

9. A method for monitoring a component situated in an exhaust gas region of an internal combustion engine, the method comprising:

ascertaining a measure for a first exhaust gas temperature upstream of the component;

measuring a second exhaust gas temperature by a temperature sensor, which occurs downstream from the component;

checking a low pass behavior, which is determined by a heat capacity of the component, by a valuation of the first exhaust gas temperature with respect to the second exhaust gas temperature;

emitting an error signal in response to a change of a predefined measure for the low pass behavior of the component; and providing at least one of (a) an amplitude comparison between the first and second exhaust gas temperatures and (b) an amplitude comparison of gradients of the first and second exhaust gas temperatures in a predefined time interval.

10. A method for monitoring a component situated in an exhaust gas region of an internal combustion engine, the method comprising:

ascertaining a measure for a first exhaust gas temperature upstream of the component;

measuring a second exhaust gas temperature by a temperature sensor, which occurs downstream from the component;

checking a low pass behavior, which is determined by a heat capacity of the component, by a valuation of the first exhaust gas temperature with respect to the second exhaust gas temperature;

emitting an error signal in response to a change of a predefined measure for the low pass behavior of the component; and providing a spectral analysis of the first and second exhaust gas temperatures.

* * * * *